US012763530B2

(12) United States Patent
Amerio et al.

(10) Patent No.: US 12,763,530 B2
(45) Date of Patent: Oct. 13, 2026

(54) PANEL ADAPTER FOR MOUNTING AN ELECTRIC CONNECTOR TO A PANEL AS WELL AS ADAPTER ASSEMBLY AND CONNECTION SET WITH SUCH A PANEL ADAPTER

(71) Applicant: TE Connectivity Italia Distribution S.r.l., Turin (IT)

(72) Inventors: Fulvio Amerio, Turin (IT); Demis Spincich, Turin (IT)

(73) Assignee: TE Connectivity Italia Distribution S.R.L., Turin (IT)

(*) Notice: Subject to any disclaimer, the term of this patent is extended or adjusted under 35 U.S.C. 154(b) by 541 days.

(21) Appl. No.: 18/451,422

(22) Filed: Aug. 17, 2023

(65) Prior Publication Data

US 2024/0063592 A1 Feb. 22, 2024

(30) Foreign Application Priority Data

Aug. 18, 2022 (IT) ........................ 102022000017394

(51) Int. Cl.
*H01R 13/74* (2006.01)
*B60L 53/16* (2019.01)

(52) U.S. Cl.
CPC ............ *H01R 13/748* (2013.01); *B60L 53/16* (2019.02); *H01R 2201/26* (2013.01)

(58) Field of Classification Search
CPC .................................................... H01R 13/748
USPC ......................................... 439/550, 551, 559
See application file for complete search history.

(56) References Cited

U.S. PATENT DOCUMENTS 3,002,175 A 9/1961 Bertram et al.
4,812,133 A * 3/1989 Fleak ................ H01R 13/6315 439/565
5,217,386 A 6/1993 Ohsumi et al.
5,941,730 A 8/1999 Uchiyama et al.
7,192,307 B1 3/2007 Tran et al.
7,547,230 B1 6/2009 Strausser et al.
8,590,348 B1 * 11/2013 Skjellerup ........... E05B 73/0017 70/57.1

(Continued)

FOREIGN PATENT DOCUMENTS

CN 206673220 U 11/2017
CN 212462257 U 2/2021

(Continued)

OTHER PUBLICATIONS

Japanese Office Action dated Nov. 26, 2024 with English translation, corresponding to Application No. 2023-132190, 6 pages.

(Continued)

*Primary Examiner* — Phuong K Dinh
(74) *Attorney, Agent, or Firm* — Barley Snyder

(57) ABSTRACT

A panel adapter configured or adapted to mount an electric connector to a panel includes a frame element, a fastening element and a guide structure. The frame element defines at least one frame opening adapted to at least partially receive the electric connector in an insertion direction, and a bearing surface surrounding the frame opening. The fastening element is adapted to fasten the frame element to a cutout of the panel. The guide structure slidably guides a slider element along the bearing surface in a translation direction.

20 Claims, 7 Drawing Sheets

(56) References Cited

U.S. PATENT DOCUMENTS

| | | | | |
|---|---|---|---|---|
| 10,700,479 | B1 * | 6/2020 | Smith | H01R 13/745 |
| 11,355,885 | B2 * | 6/2022 | Sekino | H01R 13/506 |

FOREIGN PATENT DOCUMENTS

| | | | |
|---|---|---|---|
| DE | 102019114959 | A1 | 12/2020 |
| EP | 1081802 | A1 | 7/2001 |
| EP | 1526616 | A1 | 4/2005 |
| EP | 3771305 | A1 | 1/2021 |
| JP | H04129477 | U | 11/1992 |
| JP | 2527302 | Y2 | 2/1997 |
| JP | 202119120 | A | 2/2021 |

OTHER PUBLICATIONS

Korean Office Action dated Dec. 17, 2024 with English translation, corresponding to Application No. 10-2023-0106625, 13 pages.
Extended European Search Report dated Nov. 8, 2023, corresponding to Application No. 23192192.5-1201, 11 pages.
Indian Office Action dated Nov. 13, 2025, corresponding to Application No. 202344054503, 6 pages.
Italian Search Report and Written Opinion dated Apr. 5, 2023, corresponding to Application No. 102022000017394, 11 pages.

* cited by examiner

PANEL ADAPTER FOR MOUNTING AN ELECTRIC CONNECTOR TO A PANEL AS WELL AS ADAPTER ASSEMBLY AND CONNECTION SET WITH SUCH A PANEL ADAPTER

CROSS-REFERENCE TO RELATED APPLICATION

This application claims the benefit of Italian Patent Application No. 102022000017394, filed Aug. 28, 2022, the whole disclosure of which is incorporated herein by reference.

FIELD OF THE INVENTION

Embodiments of the present disclosure relate to a panel adapter for mounting an electric connector, such as a panel mount connector of an electric vehicle or other type of electrical system, to a panel. Further, the present disclosure relates to an adapter assembly including such a panel adapter as well as a connection system including such an adapter assembly.

BACKGROUND

Electric connectors used with cables or wire harnesses are adapted to establish releasable, electrically conductive connections between units that are spaced apart or neighbour each other. For example, an electric motor might need to be connected to an inverter or an inverter requires connection to a battery module, etc. Some of these units are often integrated in a housing or chassis as part of a modular design and/or because they are manufactured by different suppliers. Thus, it is necessary to establish connections through panels, partition walls or housing walls located between the units to be connected. In these cases, electric connectors are mounted at the interface of the units, such as at cutouts of panels.

In order to securely mount the electric connector to the respective panel, a separate securing means which functions similarly to a circlip is loosely provided and must be installed appropriately to the electric connector. In such existing solutions, the securing means, however, has to be positioned, aligned and kept in the correct orientation during the entire installation. This procedure is time consuming and prone to mistakes, since the securing means could slip away or become wedged.

Therefore, it is desirable to have means for mounting electric connectors to panels which are easy to handle while reducing assembly errors.

SUMMARY

According to an embodiment of the present disclosure, a panel adapter configured or adapted to mount an electric connector to a panel includes a frame element, a fastening element and a guide structure. The frame element defines at least one frame opening adapted to at least partially receive the electric connector in an insertion direction, and a bearing surface surrounding the frame opening. The fastening element is adapted to fasten the frame element to a cutout of the panel. The guide structure slidably guides a slider element along the bearing surface in a translation direction.

BRIEF DESCRIPTION OF THE DRAWINGS

The invention will now be described by way of example with reference to the accompanying Figures, of which.

DETAILED DESCRIPTION OF THE EMBODIMENTS

Figure 1:
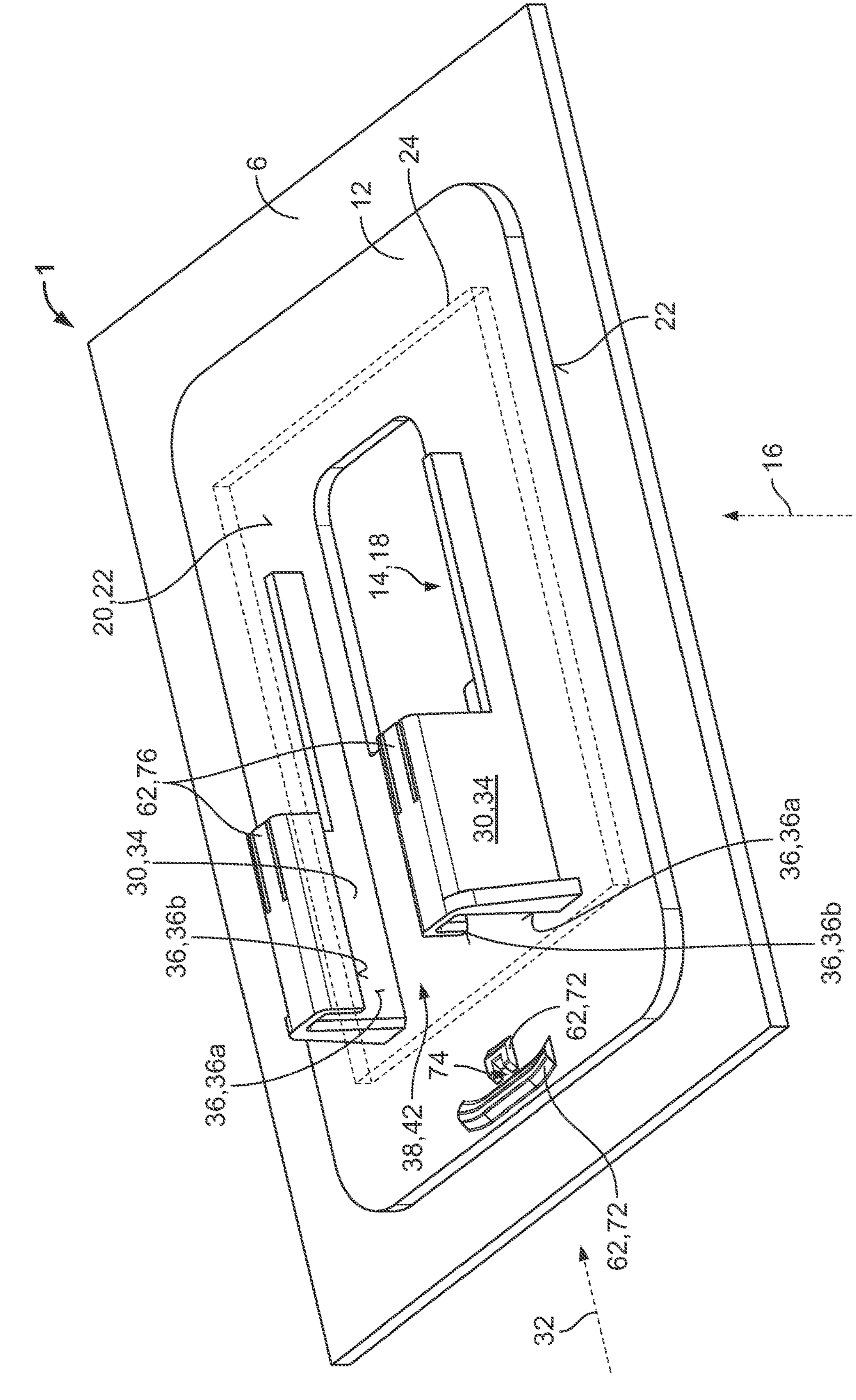
FIG. 1 shows a schematic representation of a perspective view of a panel adapter according to one possible embodiment of the present disclosure.
Figure 2:
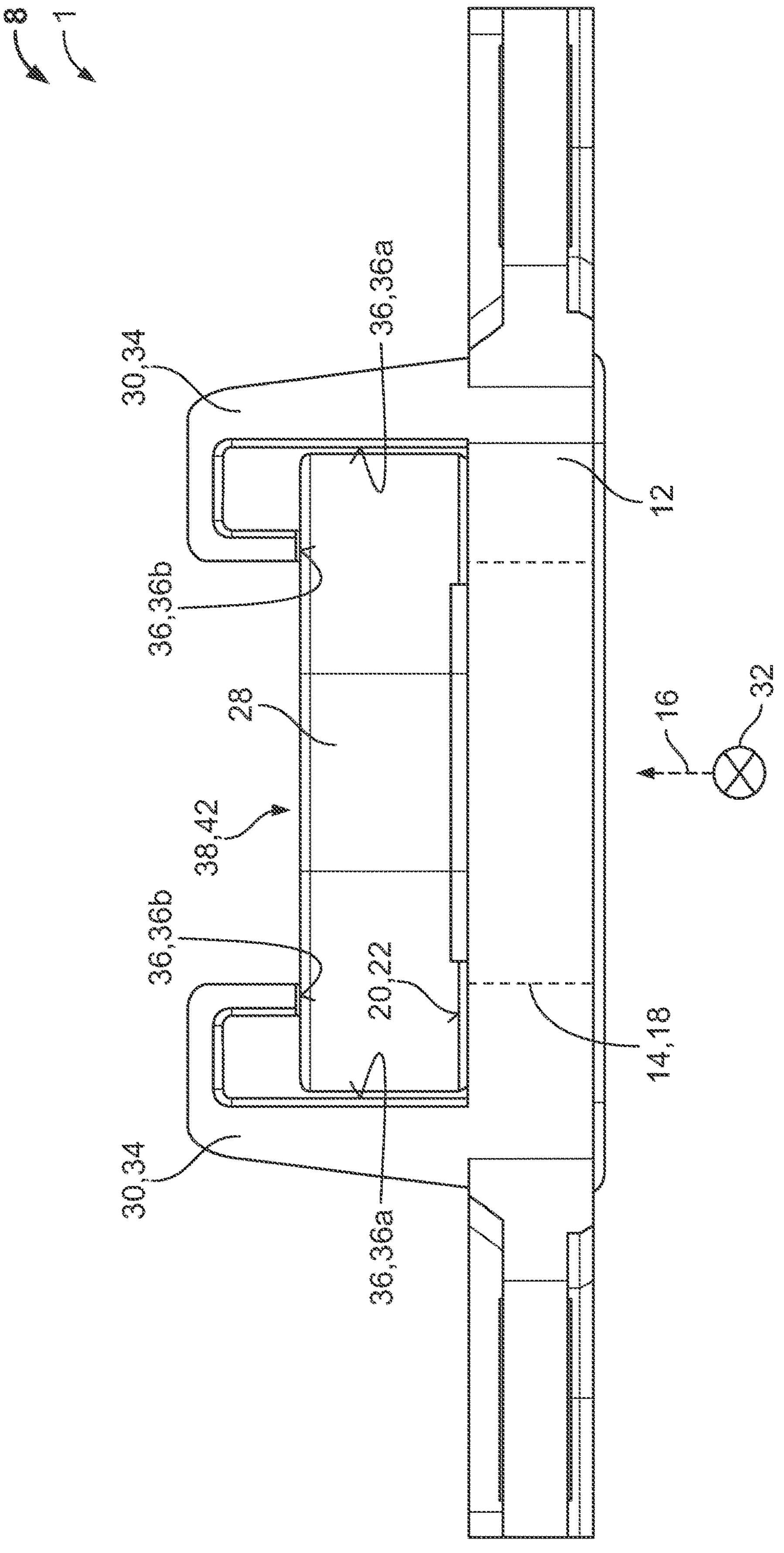
FIG. 2 shows a schematic representation of a side view of an adapter assembly according to one possible embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following, the structure of possible embodiments of a panel adapter 1 for mounting an electric connector 2, such as a panel mount connector 4 of an electric vehicle (not shown), to a panel 6 is explained with reference to the exemplary embodiments shown in FIGS. 1-7. Further, FIGS. 2-6 are used to explain the structure of an adapter assembly 8 and a connection set 10 according to the present disclosure.

FIG. 1 shows one possible embodiment of the panel adapter 1 in a perspective view. The panel adapter 1 comprises a frame element 12 with at least one frame opening 14 configured or adapted to at least partially receive the electric connector 2 in an insertion direction 16 (see FIG. 4). In the exemplary embodiment, the frame element 12 has one frame opening 14 formed as a circumferentially closed through opening 18 with an inner contour complementary to the outer contour of the electric connector 2. In particular, the frame opening 14 extends through the frame element 12 in the insertion direction 16.

A bearing surface 20 of the frame element 12 entirely surrounds the frame opening 14. The bearing surface 20 may be formed by a flat side 22 of the frame element 12 and extend perpendicularly to the insertion direction 16. According to another embodiment not shown in the figures, the bearing surface 20 may also be curved, wavy or have an uneven profile formed by the frame element 12 adjusted to the shape of a non-flat panel (not shown). Further, the bearing surface 20 may only surround a circumferential section of the frame opening 14 (e.g., less than 75% of the circumference of the frame opening). That is, the frame opening 14 may be laterally open, instead of being circumferentially closed.

As can be seen in FIG. 1, the frame element 12 may be substantially plate shaped with two flat sides 22 arranged opposite of each other. That is, a height of the frame element 12 measured parallel to the insertion direction 16 may be several times smaller than a length and width of the frame element 12 measured perpendicular to the insertion direction 16.

Still referring to FIG. 1, the panel adapter 1 is depicted attached to the panel 6, in particular, attached on top of a cutout 24 of the panel 6. For this, the frame element 12 may be welded, soldered, glued or otherwise fixed to the panel 6. According to another possible embodiment shown in FIG. 7, the panel adapter 1 may comprise means for fastening the frame element 12 to the panel 6. For example, the frame element 12 may comprise at least one eyelet 26, preferably multiple eyelets 26 for passing therethrough fastening elements (not shown) such as screws or bolts. In yet another embodiment not shown in the figures, the frame element 12 may be an integral part of the panel 6. That is, the panel 6 and frame element 12 may be manufactured as a single-piece component e.g., by rolling, forging, drawing, stamping or the like.

The panel 6 may be a general panel, a partition wall, a housing wall or part of a chassis to which the electric connector 2 is to be mounted by means of the panel adapter 1 and a slider element 28 (see FIGS. 2 to 6). In FIG. 1, the cutout 24 of the panel 6 is larger than the frame opening 14. According to an alternative embodiment not shown in the figures, the cutout 24 may also be congruent with or smaller than the frame opening 14. Preferably, an inner contour of the cutout 24 is smaller than or equal to an outer contour of the frame element 12.

At least one guide structure 30 for slidably guiding the slider element is located on the bearing surface 20 of the frame element 12. The guide structure 30 may be monolithically connected with the frame element 12. That is, the guide structure 30 and frame element 12 may be a single-piece component made by injection moulding, additive manufacturing, or the like. Alternatively, the guide structure 30 may be provided as a separate part and fastened to the frame element 12 or directly to the panel 6 by means of screwing, bolting, welding, soldering, gluing, or the like.

The guide structure 30 serves as a guide for the slider element 28, which is movable along the bearing surface 20 in a translation direction 32. In particular, the guide structure 30 extends transversely, preferably perpendicularly to the insertion direction 16 and parallel to the translation direction 32. Specifically, the guide structure 30 may be located adjacent to the frame opening 14 and at least sectionally extend past the frame opening 14.

In the exemplary embodiment shown in FIG. 1, the guide structure 30 is designed as a rail 34 extending on the bearing surface 20 in the translation direction 32. Further, in the exemplary embodiment shown in FIG. 1, the panel adapter 1 comprises two guide structures 30 that are arranged opposite each other with respect to the frame opening 14. In particular, the two guide structures 30 are mutually mirror-inverted.

To guide the slider element 28, each guide structure 30 may comprise at least one slide surface 36, preferably multiple slide surfaces **36*a*, 36*b*. First slide surfaces 36*a* may border the bearing surface 20 at an angle, preferably a 90°-angle. Moreover, the first slide surfaces 36*a* may extend on the two guide structures 30 in a mutually parallel manner. The slider element 28 may be at least partly located between the two guide structures 30, in particular between the first slide surfaces 36*a*. Further, the first slide surfaces 36*a* and the bearing surface 20 may jointly define a guiding groove 38 for the slider element 28 (see FIG. 2). Thereby, the slider element 28 and the panel adapter 1 may form a linear plain bearing 40, in which the slider element 28 is guided by the panel adapter 1**.

The second slide surfaces **36*b* may be spaced apart from the bearing surface 20. Further, the second slide surfaces 36*b* may face towards the bearing surface 20. Preferably, the second slide surfaces 36*b* extend parallel to the bearing surface 20 and define together with the first slide surfaces 36*a* and the bearing surface 20 a duct 42 for the slider element 28 (see FIG. 2). The slider element 28 may at least partly be located between the guide structures 30 and the frame element 12, in particular between the second slide surfaces 36*b* and the bearing surface 20. Thereby, the slider element 28 may be captively held by the panel adapter 1**.

In FIGS. 2-5, possible embodiments of the adapter assembly 8 are shown. The adapter assembly 8 comprises the panel adapter 1 according to any one of the above-described embodiments and the slider element 28. As set forth above, the slider element 28 is guided by the guide structure 30 movable between a release position 44 (see FIG. 4) and a securing position 46 (see FIG. 5). Compared to the slider element 28 in the release position 44, the slider element 28 in the securing position 46 is closer to the frame opening 14.

Figure 3:
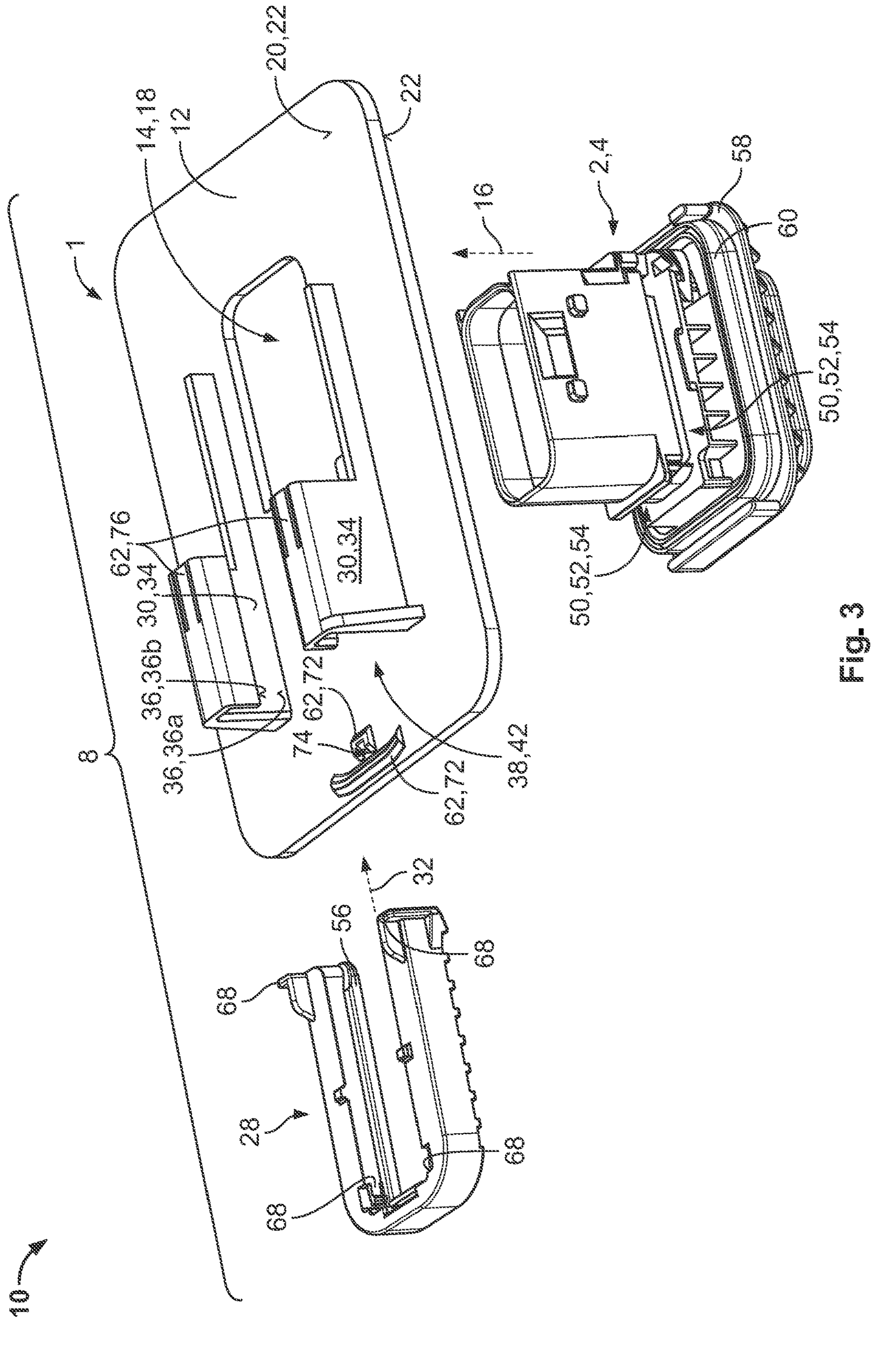
FIG. 3 shows a schematic representation of an exploded view of a connection set according to one possible embodiment of the present disclosure.

FIG. 3 shows an exploded perspective view of the connection set 10 according to one possible embodiment of the present disclosure. The connection set 10 comprises the adapter assembly 8 and the electric connector 2. The electric connector 2 may be a panel mount connector 4 adapted to be at least partially inserted into the frame opening 14 (see FIG. 4). Thus, the slider element 28 in the securing position 46 is closer to the panel mount connector 4 inserted into the frame opening 14 than the slider element 28 in the release position 44.

The panel mount connector 4 may comprise at least one recess 50 for at least partially receiving the slider element 28. In particular, the recess 50 may be adapted to engage with the slider element 28, when the slider element 28 is in the securing position 46. The recess 50 may be designed as a groove 52 or slot 54 extending transversely, preferably perpendicularly to the insertion direction 16. More preferably, the slot 54 runs parallel to the guiding groove 38 and duct 42, when the panel mount connector 4 is received in the frame opening 14. Most preferably, the slot 54 forms an extension of the guiding groove 38 and duct 42, when the panel mount connector 4 is received in the frame opening 14.

Figure 4:
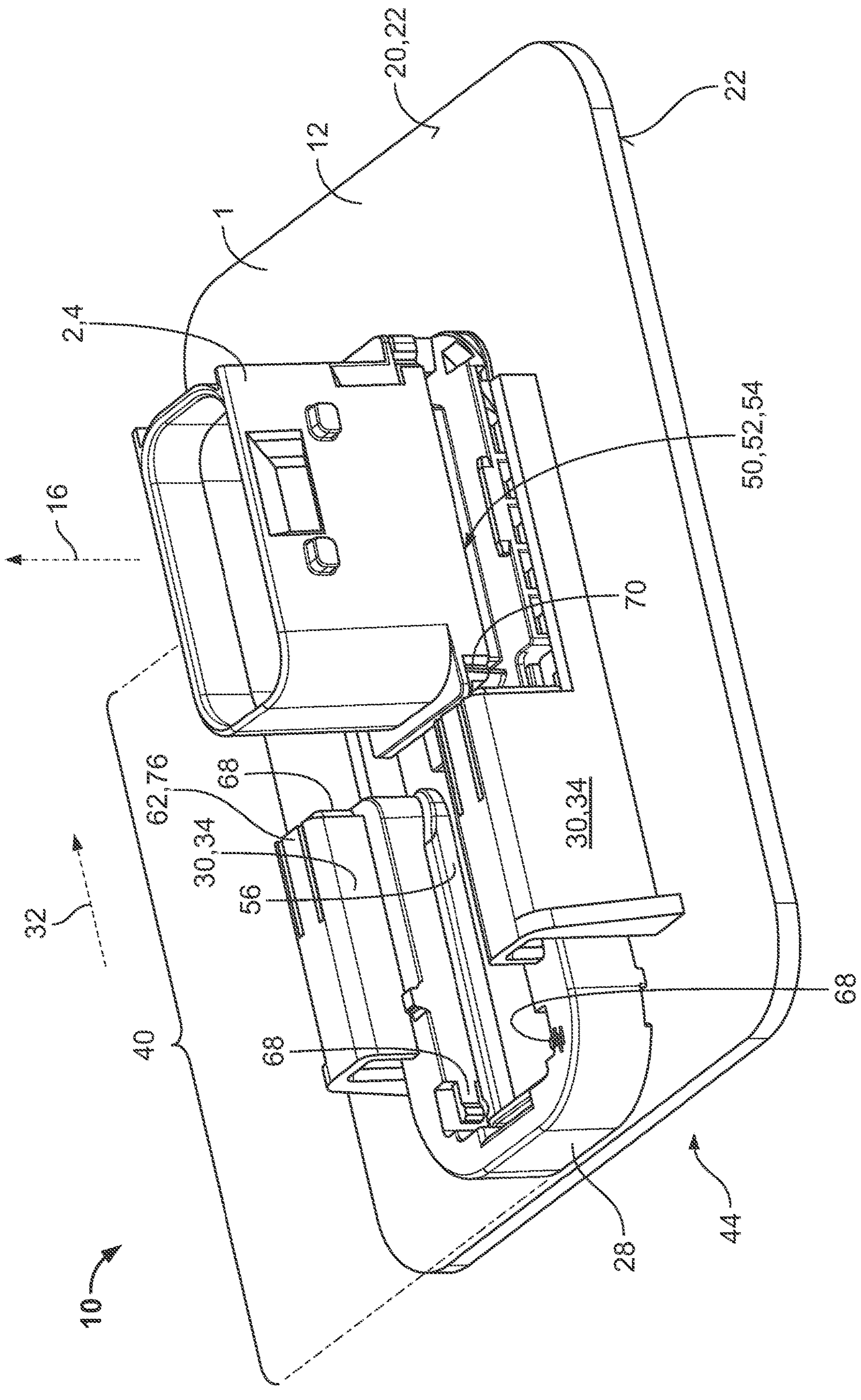
FIG. 4 shows a schematic representation of a perspective view of the connection set according to the embodiment shown in FIG. 3.

As can be seen in FIGS. 3 and 4, the slider element 28 may comprise at least one lock section 56, preferably formed complementarily to the slot 54. The lock section 56 may overlap with the frame opening 14, when the slider element 28 is in the securing position 46. In particular, the lock section 56 and frame opening 14 may overlap with each other in the insertion direction 16, when the slider element 28 is in the securing position 46.

The panel mount connector 4 may comprise a flange 58 spaced apart from the slot 54. In particular, the distance between the flange 58 and the slot 54 may be equal to or greater than the height of the frame element 12 measured in the insertion direction 16. In other words, the frame element 12 fits in the space between the flange 58 and the slot 54.

Optionally, the panel mount connector 4 may comprise a seal ring 60 located between the flange 58 and the slot 54. The seal ring 60 may be seated on the flange 58 and be spaced apart from the slot 54. In particular, the distance between the seal ring 60 and the slot 54 may be equal to or smaller than the height of the frame element 12 measured in the insertion direction 16. That is, the frame element 12 only fits in the space between the seal ring 60 and the slot 54, if the seal ring 60 abuts the frame element 12 and, if necessary, is compressed between the flange 58 and the frame element 12.

Figure 5:
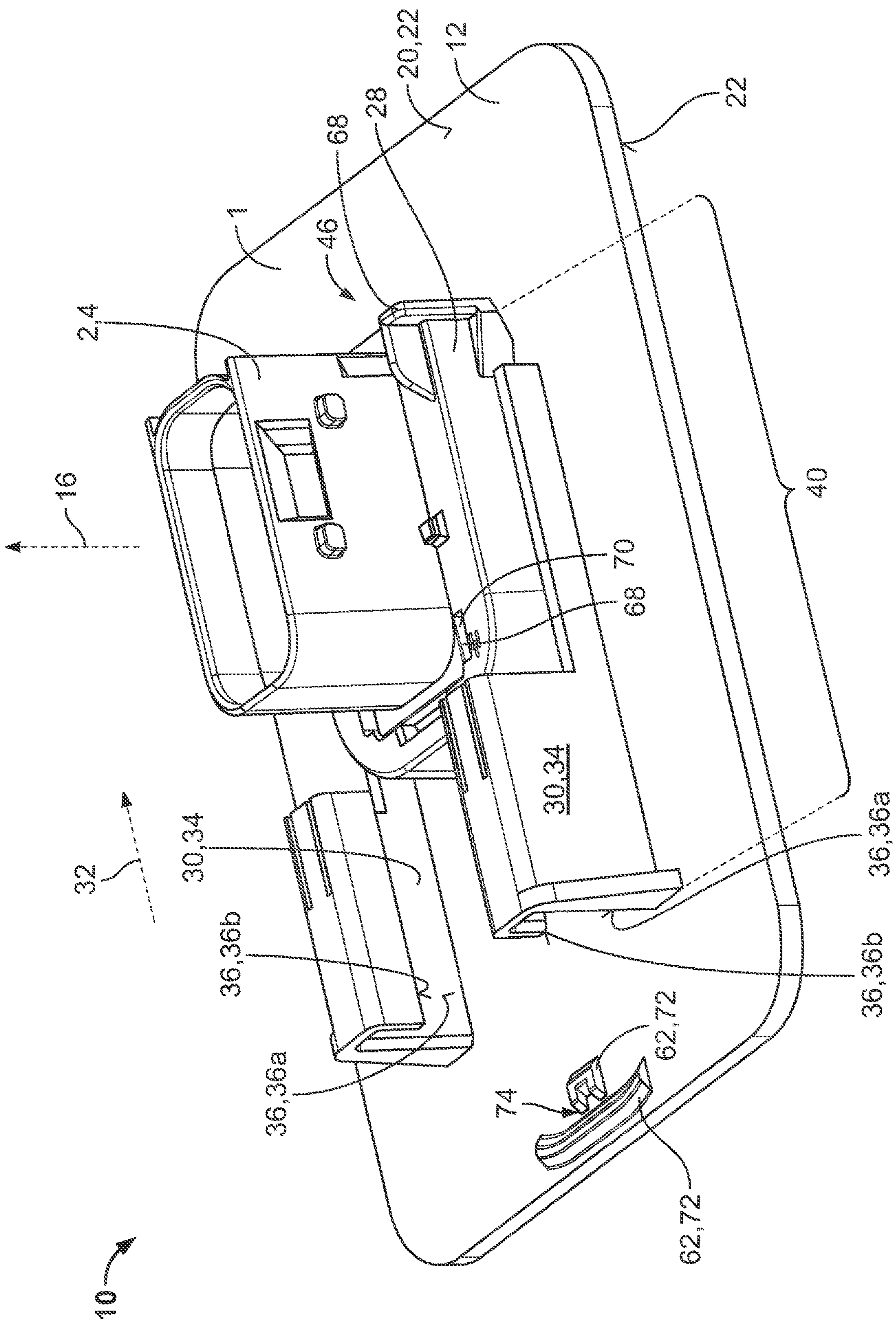
FIG. 5 shows another schematic representation of a perspective view of the connection set according to the embodiment shown in FIG. 3.
Figure 6:
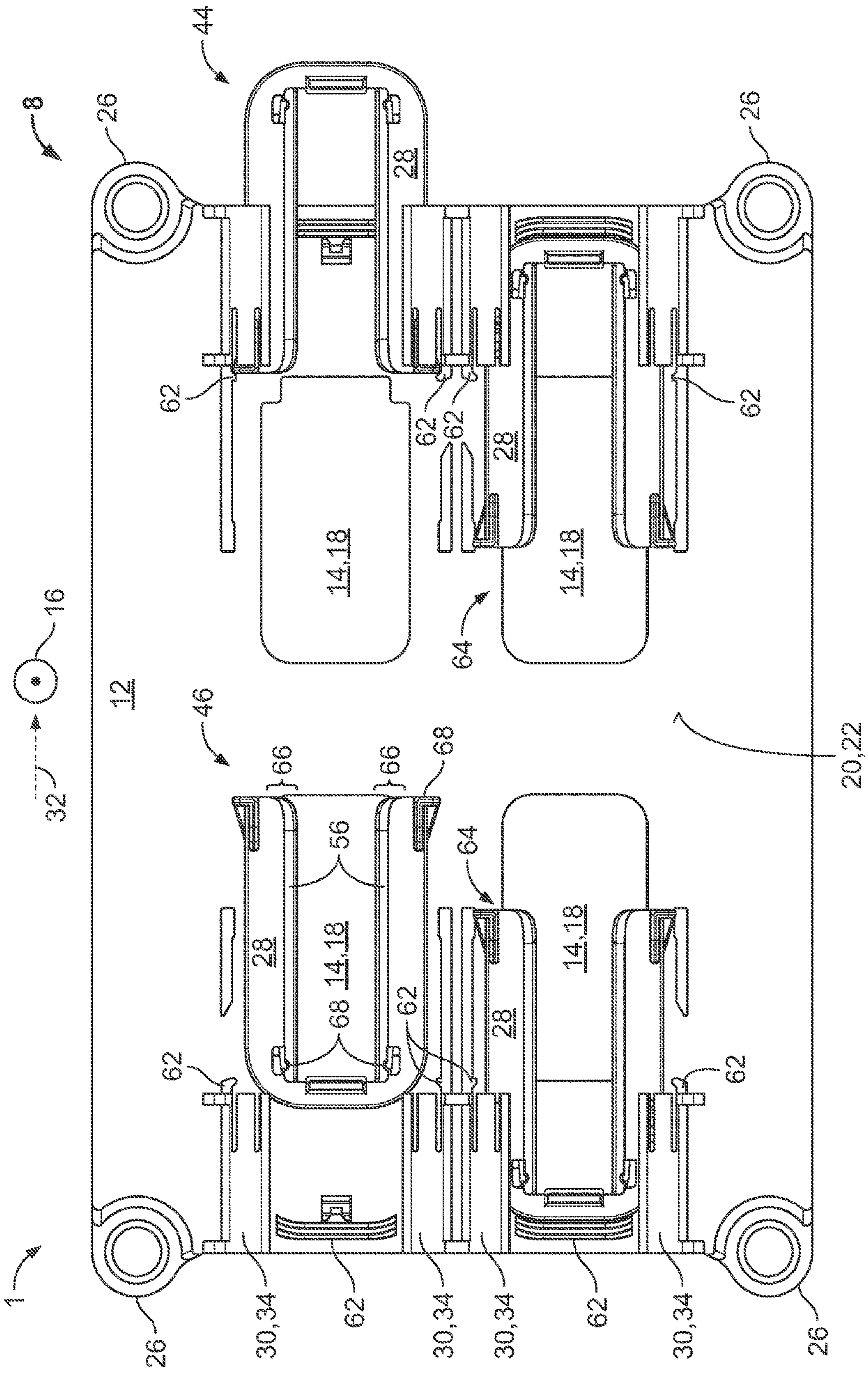
FIG. 6 shows a schematic representation of a top view of an adapter assembly according to another possible embodiment of the present disclosure.

In the shown embodiments, the slider element 28 comprises two lock sections 56 arranged opposite of each other with respect to the frame opening 14 (see FIG. 6). Accordingly, the panel mount connector 4 comprises two slots 54, one for each lock section 56. As can be seen in FIG. 5, the slider element 28 in the securing position 46 encompasses the panel mount connector 4 inserted into the frame opening 14, while the two lock sections 56 engage in a form fit with the panel mount connector 4 at the two slots 54. For this, the slider element 28 is U-shaped in a cross-section parallel to the bearing surface 20. However, the slider element 28 may also be substantially straight and configured in the manner of a slide bolt, which is captively held and guided by the guide structure(s) 30.

The adapter assembly 8 may comprise at least one latching element 62 for catching the slider element 28 in the release position 44. Alternatively, the latching element 62 may be adapted for catching the slider element 28 in the securing position 46. Further alternatively, the latching element 62 may be adapted for catching the slider element 28 in an intermediate position 64 between the release position 44 and the securing position 46 (see FIG. 6).

As can be seen in the upper left side of FIG. 6, the slider element 28 in the securing position covers at least a section 66 of the frame opening 14. In the intermediate position 64, the slider element 28 still covers the frame opening 14 partially (see lower left and right side of FIG. 6). When in the release position 44, the slider element 28 clears the frame opening, in particular the previously covered section 66 (see upper right side of FIG. 6)

The latching element 62 may be located on the panel adapter 1 or on the slider element 28. Accordingly, the latching element 62 may be adapted to engage with a complementary latching element 68 on the slider element 28 or on the panel adapter 1, respectively. The latching element 68 on the slider element 28 may be additionally or alternatively adapted to engage with a complementary latching element 70 on the panel mount connector 4 (see FIG. 5).

The latching element 62 of the panel adapter 1 may be located on the frame element 12 or on the guide structures 30. In particular, the latching element 62 may be a latching cam 72 protruding on the bearing surface 20, wherein the slider element 28 comprises a latching notch (not shown). Optionally, two latching cams 72 may be provided and jointly form a latching notch 74 for the slider element 28. In this case, the slider element 28 itself does not require any latching notch.

Alternatively or additionally, the latching element 62 may be a flexible latching prong 76 formed by the respective guide structure 30. Optionally, each latching prong 76 may form part of the first slide surfaces **36*a* or the second slide surfaces 36*b*. Further, each latching prong 76 may comprise a hook (not shown) at a free end for engaging the slider element 28. Optionally, the adapter assembly 8 may comprise two or more latching elements 62 spaced apart from each other for catching the slider element in the release position 44, the securing position 46 and/or the intermediate position 64**, respectively.

Figure 7:
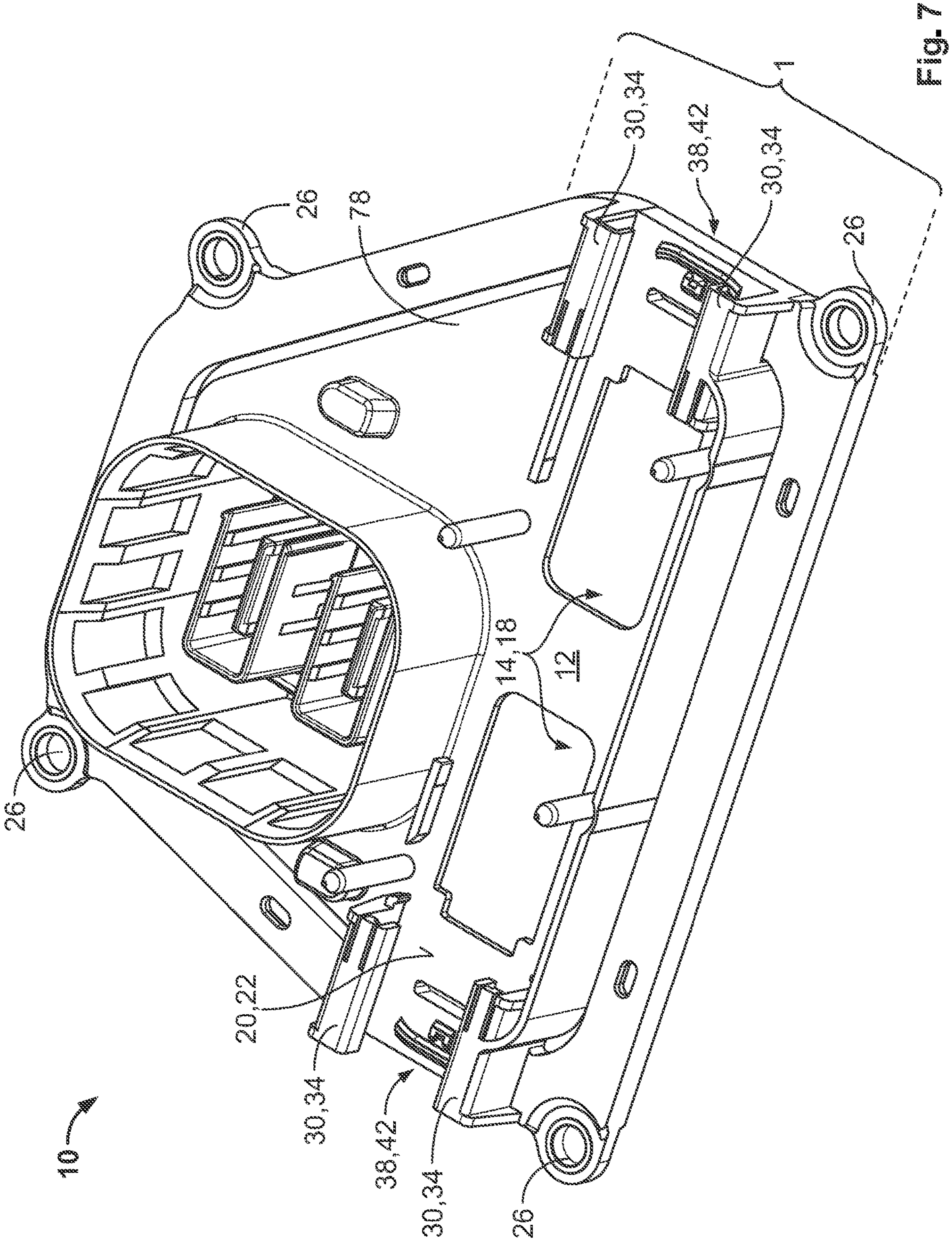
FIG. 7 shows a schematic representation of a perspective view of a panel adapter according to another possible embodiment of the present disclosure.

Further, the frame element 12 may comprise multiple frame openings 14, each for receiving one electric connector 2 (see FIGS. 6 and 7). Accordingly, the adapter assembly 8 may comprise multiple slider elements 28, preferably one slider element 28 for each frame opening 14 as is shown in FIG. 6. Moreover, the connection set 10 may comprise up to multiple panel mount connectors 4, preferably one panel mount connector 4 for each frame opening 14. As can be seen in FIG. 7, the frame element 12 may be formed by a housing 78 of a header connector 80. In this way, the panel adapter 1 may be an integral part of the header connector 80.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A panel adapter adapted to mount an electric connector to a panel, comprising:
- a frame element, having:
  - at least one frame opening adapted to at least partially receive the electric connector in an insertion direction; and
  - a bearing surface surrounding the frame opening;
- at least one fastening element adapted to fasten the frame element to a cutout of the panel; and
- at least one guide structure adapted to slidably guide a slider element along the bearing surface in a translation direction.

2. The panel adapter according to claim 1, wherein the frame opening extends through the frame element in the insertion direction.

3. The panel adapter according to claim 2, wherein the guide structure is located on the bearing surface and the translation direction extends transversely to the insertion direction.

4. The panel adapter according to claim 1, wherein the guide structure comprises at least one slide surface at least one of spaced apart from or facing towards the bearing surface.

5. The panel adapter according to claim 1, wherein the guide structure is monolithically connected with the frame element.

6. An adapter assembly, comprising:
- a panel adapter adapted to mount an electric connector to a panel, including:
  - a frame element, having:
    - at least one frame opening adapted to at least partially receive the electric connector in an insertion direction; and
    - a bearing surface surrounding the frame opening;
  - at least one fastening element adapted to fasten the frame element to a cutout of the panel; and
  - at least one guide structure; and
- a slider element guided by the guide structure to slide along the bearing surface in a translation direction between a release position and a securing position, the slider element in the securing position is closer to the frame opening than in the release position.

7. The adapter assembly according to 6, wherein the slider element and the panel adapter form a linear plain bearing.

8. The adapter assembly according to claim 7, wherein the slider element and guide structure engage in a form—fit acting in the insertion direction.

9. The adapter assembly according to claim 6, wherein the slider element is at least partly located between the guide structure and the bearing surface.

10. The adapter assembly according to claim 6, further comprising at least one latching element for fixing the slider element in at least one of the release position, the securing position, or an intermediate position between the release position and the securing position.

11. The adapter assembly according to claim 10, wherein the at least one latching element includes at least two latching elements spaced apart from each other.

12. The adapter assembly according to claim 11, wherein the at least two latching elements are located on at least one of the guide structure or on the bearing surface.

13. The adapter assembly according to claim 6, wherein the slider element covers at least a first section of the frame opening in the securing position and uncovers the first section in the release position.

14. The adapter assembly according to claim 6, wherein the slider element includes at least one lock section that overlaps with the frame opening in the insertion direction when the slider element is in the securing position.

15. The adapter assembly according to claim 14, wherein at least one of:
- the slider element includes two lock sections; or
- the panel adapter includes two guide structures that are arranged opposite of each other with respect to the frame opening.

16. The adapter assembly according to claim 6, wherein the slider element is U—shaped in a cross—section parallel to the bearing surface.

17. A connection system, comprising:
- an adapter assembly, comprising:
  - a panel adapter for mounting an electric connector to a panel, including:
    - a frame element, having:
      - at least one frame opening adapted to at least partially receive the electric connector in an insertion direction; and
      - a bearing surface surrounding the frame opening;
    - at least one fastening element adapted to fasten the frame element to a cutout of the panel; and
    - at least one guide structure; and
  - a slider element guided by the guide structure to slide along the bearing surface in a translation direction between a release position and a securing position, the slider element in the securing position is closer to the frame opening than in the release position; and
- the electric connector at least partially inserted into the frame opening in the insertion direction.

18. The connection system according to claim 17, wherein the electric connector includes at least one recess at least partially receiving the slider element.

19. The connection system according to claim 18, wherein the at least one recess extends transversely to the insertion direction.

20. The connection system according to claim 19, wherein:
- in the securing position, the slider element is received at least partially in the at least one recess of the electric connector;
- the electric connector defines a flange spaced apart from the at least one recess; and
- the electric connector includes a seal ring located between the flange and the at least one recess.

* * * * *